Aug. 25, 1970   B. B. D'EWART, JR   3,525,887
MOTOR WITH LINEAR RECIPROCATING OUTPUT
Filed Aug. 16, 1968   6 Sheets-Sheet 1
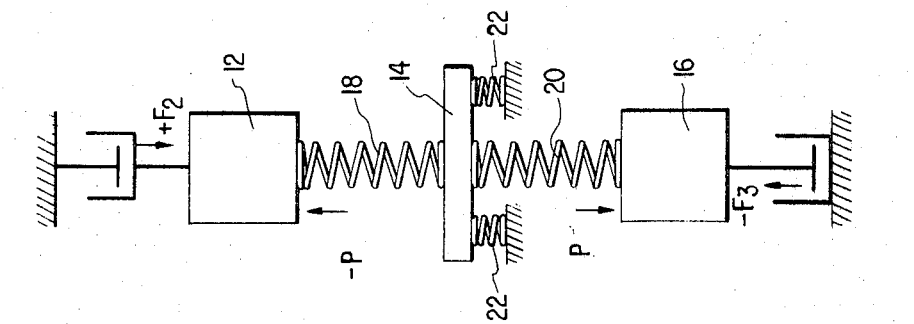
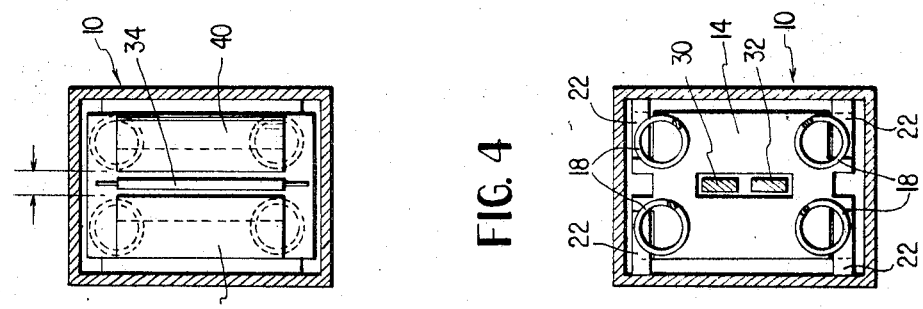
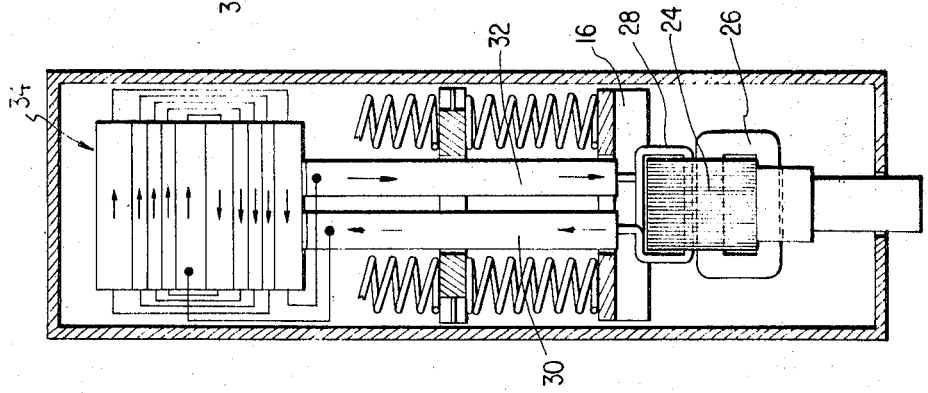
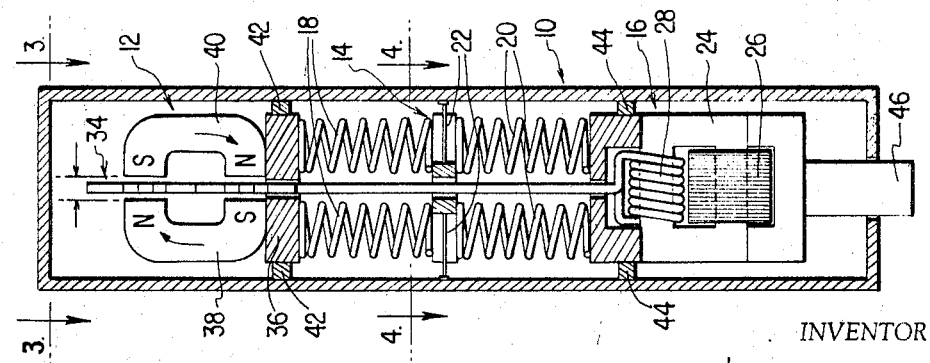
INVENTOR
BENJAMIN B. D'EWART, JR.
BY Bean & Bean
ATTORNEYS.

Aug. 25, 1970  B. B. D'EWART, JR  3,525,887
MOTOR WITH LINEAR RECIPROCATING OUTPUT
Filed Aug. 16, 1968  6 Sheets-Sheet 2
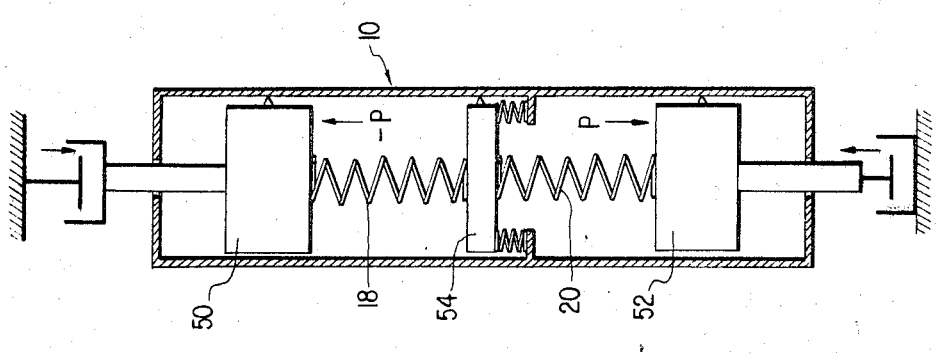
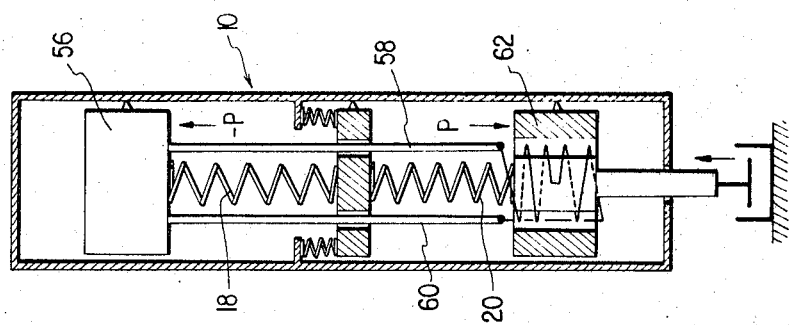
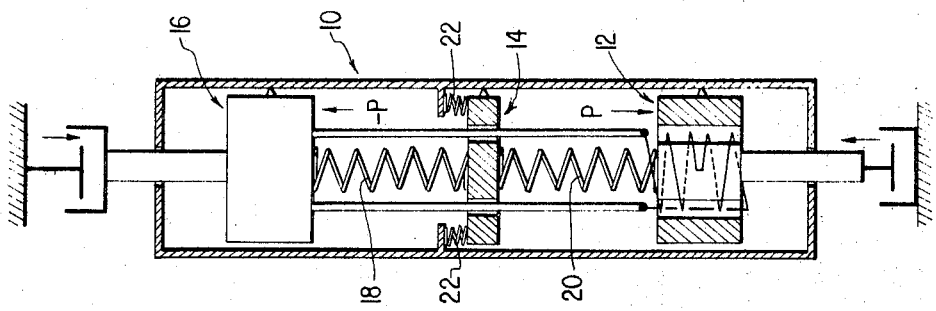
INVENTOR
BENJAMIN B. D'EWART, JR.
BY  *Bean & Bean*
ATTORNEYS.

Aug. 25, 1970 B. B. D'EWART, JR 3,525,887
MOTOR WITH LINEAR RECIPROCATING OUTPUT
Filed Aug. 16, 1968 6 Sheets-Sheet 3

INVENTOR
BENJAMIN B. D'EWART, JR.

BY Bean & Bean

ATTORNEYS

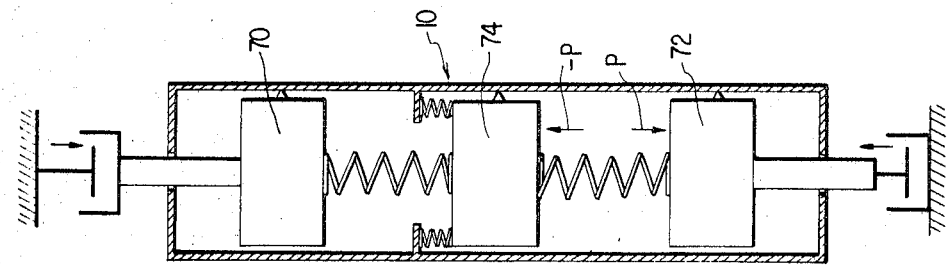
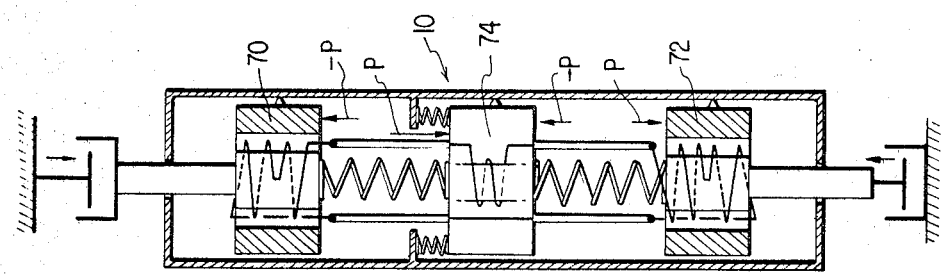
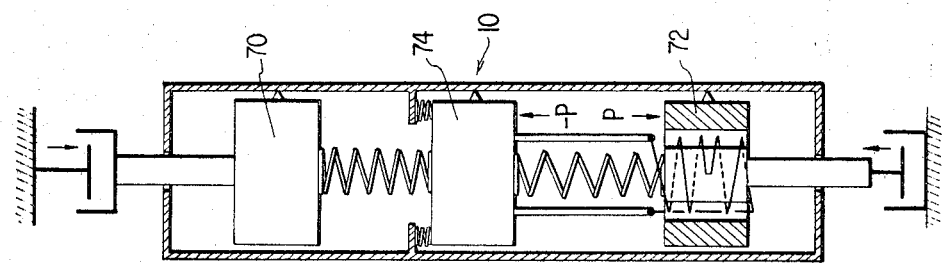
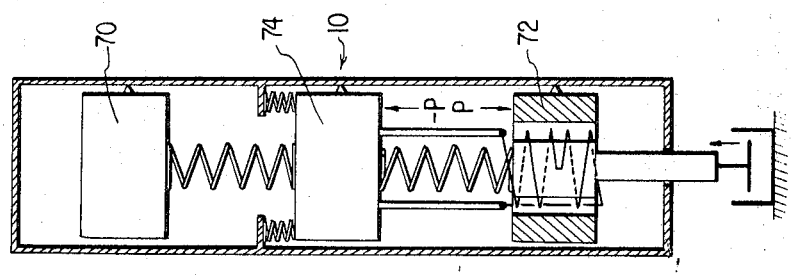

Aug. 25, 1970  B. B. D'EWART, JR  3,525,887
MOTOR WITH LINEAR RECIPROCATING OUTPUT
Filed Aug. 16, 1968  6 Sheets-Sheet 5
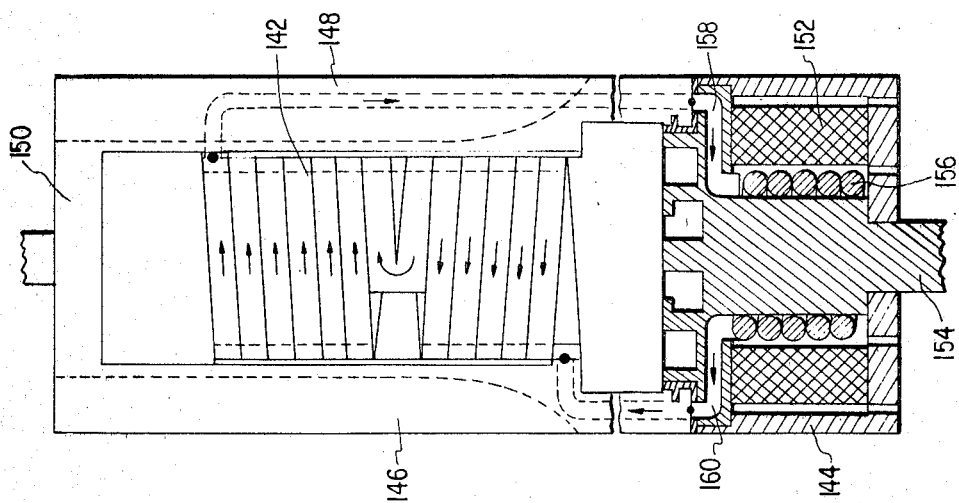
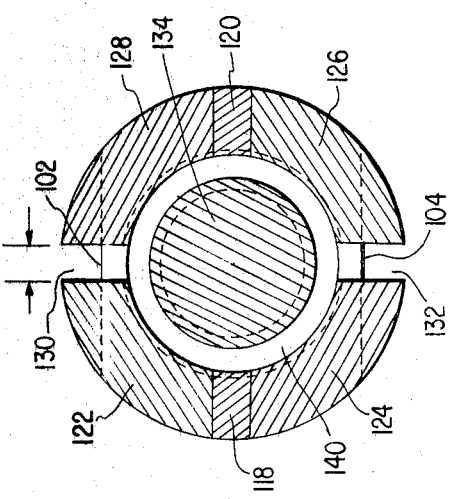
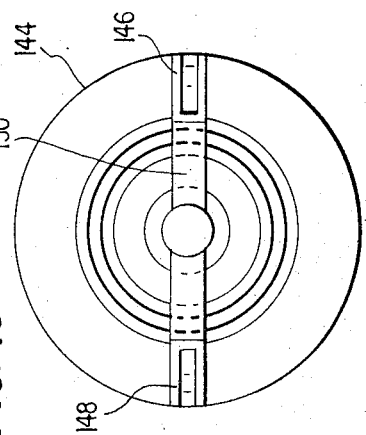
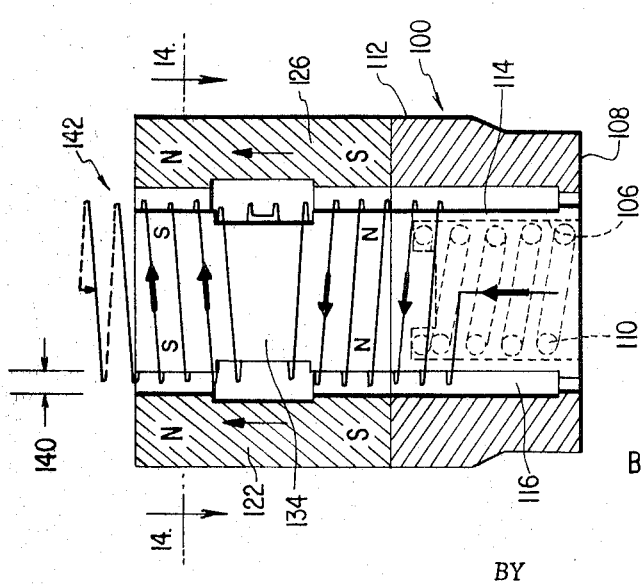
INVENTOR
BENJAMIN B. D'EWART, JR.
BY  Bean & Bean
ATTORNEYS Aug. 25, 1970   B. B. D'EWART, JR   3,525,887
MOTOR WITH LINEAR RECIPROCATING OUTPUT
Filed Aug. 16, 1968   6 Sheets-Sheet 6
FIG. 17
FIG. 18
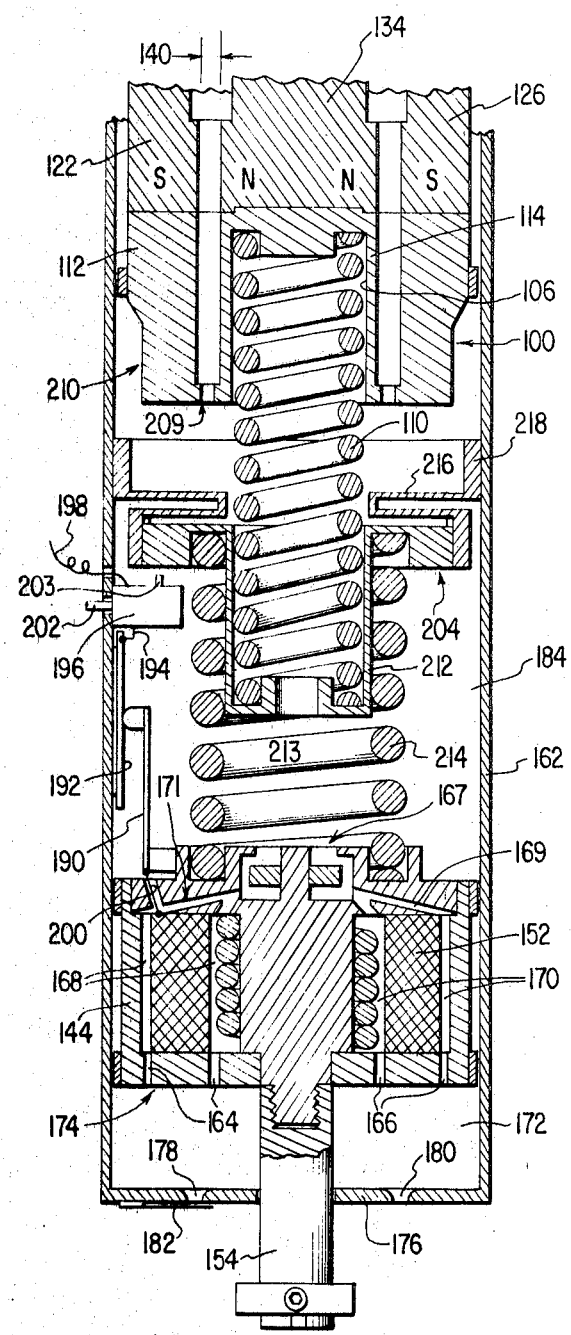
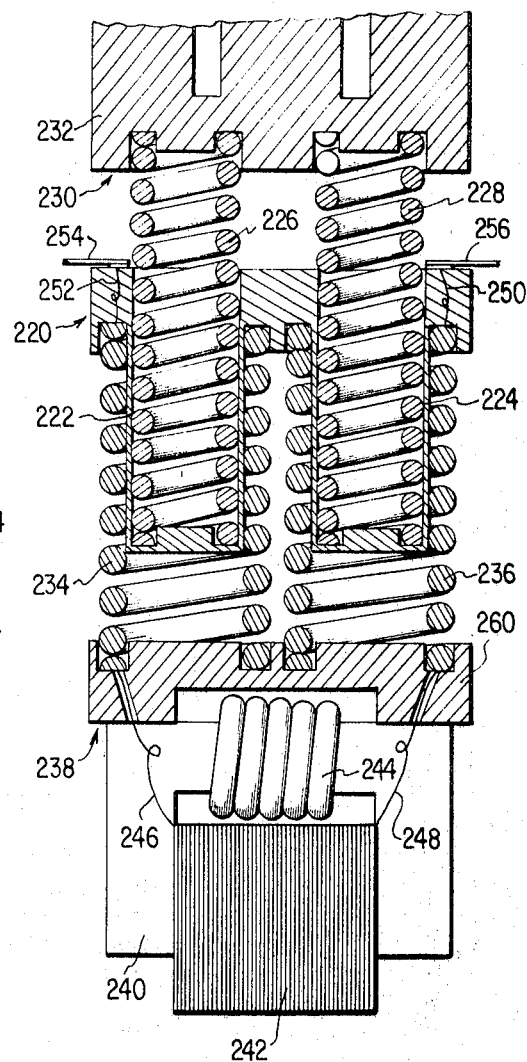
INVENTOR
BENJAMIN B. D'EWART, JR.
BY
ATTORNEYS United States Patent Office 3,525,887
Patented Aug. 25, 1970

3,525,887
MOTOR WITH LINEAR RECIPROCATING
OUTPUT
Benjamin B. D'Ewart, Jr., 3465 Warner Drive,
Grand Island, N.Y. 14072
Filed Aug. 16, 1968, Ser. No. 753,291
Int. Cl. H02k 33/04
U.S. Cl. 310—27                                        6 Claims

ABSTRACT OF THE DISCLOSURE

Three masses aligned in a casing and resiliently mounted therein form a linear motor. Work is taken from one or both of the end masses and conversion between electrical and mechanical energy is effected by providing one of the masses with a permanent magnet assembly producing a strong magnetic field, with another of the masses carrying a winding disposed within such field, the winding powered directly from line voltage or indirectly through a voltage control device and effective to cause reciprocation of the mass system with negligible vibration transmitted to the casing.

BACKGROUND OF THE INVENTION

There are many instances in which it is desirable to produce reciprocatory motion for performing various kinds of work. For example, in hand power tools such as saber saws, sanding devices and the like, the motion of the tool is reciprocatory. A common way of producing this motion is to provide an electric motor of the rotary type provided with suitable mechanical drive mechanism to impart the requisite reciprocatory motion to the tool. This arrangement necessarily incorporates some degree of weight and complexity in the mechanical drive arrangement and it would be desirable to effect direct conversion of electrical energy to reciprocating mechanical motion by means of so-called linear motors. However, linear motors of conventional construction inherently possess the disadvantage of excessive case vibration which is not desirable in hand-operated tools and they must be made of comparatively large and bulky size in order to meet the power and stroke length requirements necessary. Furthermore, linear motors ordinarily vary considerably in their stroke depending upon the applied load whereas in many hand tool operations, it is desirable to maintain a relatively large stroke to effect efficient operation of the tool. In another application of linear motors where small stroke and large force output is called for, it would be desirable to develop a work output force which is a number of times larger than the force developed directly between the energy conversion elements of the motor.

BRIEF SUMMARY OF THE INVENTION

The present invention relates to linear motors and is particularly directed to an arrangement wherein fractional horsepower motors sufficiently powerful to operate heavy duty hand tools may be made in small and compact sizes and without the disadvantage of poor stroke characteristics and excessive casing vibration incidental to their use. The manner in which the above is accomplished is by providing a linear motor which consists of a reciprocating mass system in which three masses are aligned in a casing and provided with resilient interconnecting mechanism supporting them both with respect to each other and with respect to the casing. One or both of the end masses are used to extract work from the system and the conversion between electrical and mechanical energy is effected by incorporating within the mass system a winding movable within a strong permanent magnet flux field. The winding and permanent magnet mechanisms are carried by different masses, and are particularly suitable for large relative motions, with small amplitude dropoff with load application.

Within the framework of the above arrangement, the provision of natural frequencies of the end masses which are substantially equal to each other and to the frequency of the alternating current source allows the arrangement to produce a substantial working stroke without imparting excessive vibration to the casing while, at the same time, more efficiently effecting the electrical to mechanical energy conversion. In applications where short strokes are suitable, the present invention allows a sinusoidal force to be delivered to the work which is a number of times larger than the size of the force developed directly by the current flowing in the power coil.

BRIEF DESCRIPTION OF THE DRAWING

FIG. 1 is a longitudinal section taken through a linear motor according to this invention and showing the relative disposition of component parts of the mass system;

FIG. 2 is a view similar to FIG. 1 but taken at right angles thereto;

FIG. 3 is a transverse section taken substantially along the plane of section line 3—3 in FIG. 1 and illustrating the cooperative relationship between the permanent magnet assembly and the winding assembly;

FIG. 4 is a transverse section taken substantially along the section line 4—4 in FIG. 1 and illustrating details of the center mass and its mounting arrangement;

FIG. 5 is a diagrammatic view illustrating dynamic elements of the system according to FIG. 1;

FIGS. 6, 7a, 7b, 8a, 8b are diagrammatic views illustrating dynamic elements of one general type of linear motor according to this invention;

FIGS. 9–12 are diagrammatic illustrations showing the dynamic elements of another general type of linear motor according to this invention;

FIG. 13 is an enlarged view showing a modified form of the permanent magnet and coil assembly;

FIG. 14 is a transverse section taken along the plane of section line 14—14 in FIG. 13;

FIG. 15 is a longitudinal section showing a general arrangement of power coil and transformer assembly according to FIG. 13;

FIG. 16 is an end view of the assembly shown in FIG. 15;

FIG. 17 is a longitudinal section showing a modified form of the 3 mass, spring mounted system, and supplemental practical operating features;

FIG. 18 shows a further modified form of the mass system; and

DETAILED DESCRIPTION OF THE INVENTION

Figure 7B:
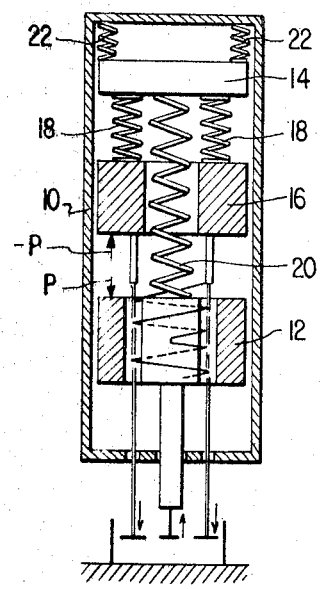

With reference to FIG. 1 which shows a rudimentary form of the invention, the assembly includes a casing 10 within which are located three masses 12, 14 and 16 with their respective centers of gravity falling along one straight line. The two end masses 12 and 16 are connected to the intermediate mass 14 by spring means 18 and 20 respectively and the center mass 14 is connected to the casing by spring means 22 which has no more stiffness than is necessary to hold the three masses from excessive net displacement within the case against any net thrust from work output force. Small motions of the intermediate mass 14 are necessary under some circumstances for essential transfer of energy from one end mass to the other. Excessive stiffness of spring 22 does not aid this energy transfer, but contributes unnecessarily to the small vibratory force going into the casing. Both the upper and lower end masses may be provided with slipper portions 42 and 44 serving slidably to guide them within the casing 10. As will be shown hereinafter, the individual masses plus appropriate portions of their associated springs form mass systems operating together with three degrees of freedom. The two end masses as mounted from the intermediate mass are given natural frequencies essentially identical to the frequency of the power source.

In the particular configuration shown in FIG. 1, the upper end mass 12 comprises a base 36 serving to mount the permanent magnets 38 and 40 having their North and South poles aligned as shown to produce a dense magnetic flux field across two air gaps.

Winding assembly 34 operates within these air gaps. Winding assembly 34 may be in the form of conducting bars extending from side to side and bonded into a flat sheet with suitable surface insulation and electrical separation between bars. Bars are electrically connected at their ends in the fashion diagrammatically shown in FIG. 2 so that current flow (for one direction) is as indicated by the arrows.

As can be seen also in FIG. 2, the bus bars 30 and 32 serve to rigidly attach winding assembly 34 to lower mass 16, with suitable electrical isolation, making this winding and the bars mechanically also part of lower end mass 16.

Upper base 42 has a central slot receiving the winding 34 and bus bars 30 and 32 with suitable electrical and mechanical separation. Corresponding slots are also provided in center mass 14 for passage of the bars with clearance.

The lower end of bars 30 and 32 are connected electrically to the source of power. This may be indirect through a transformer where winding 34 and magnetic field system are designed for other than line voltage as subsequently discussed; or may be direct where winding 34 and magnetic field system are designed for line voltage operation.

Where a transformer is used, it may be located: (a) apart from the motor; (b) attached to the motor casing; or (c) made part of lower mass 16 as shown in FIGS. 1 and 2 with core 24, primary winding 26, and secondary winding 28. The advantages of each location will be made apparent by subsequent equations showing the effects of the mass.

When a transformer is made part of an end mass, it should be impregnated with a high temperature bonding resin or equivalent to achieve ruggedness.

With the general system as above described, a suitable source of alternating current, say a 115 volt 60 cycle supply, causes a sinusoidal AC current to flow in the winding 34. The current flow in winding 34 operating in the air gap between the magnets 38 and 40 causes relatively opposite reciprocatory motion to be imparted to the end masses 12 and 16. This reciprocatory motion will automatically be at the frequency of the source voltage. The lower end mass 16 is provided with a shank 46 projecting through the casing 10 to which a suitable device such as a saw blade is attached for extracting work from the system.

An important reason for using a coil moving in a magnetic field (rather than AC magnetized iron with closing magnetic circuit action) is to provide accurate control over the no load stroke amplitude, and capability for a very small no load to full load stroke drop-off by observing the following.

The velocity of the coil through the magnetic field generates a back EMF which opposes the voltage applied to the coil. This back EMF in winding 34 is given by $$E = \frac{BLv}{10^8} \text{ volts} \quad (a)$$

The motor magnetic circuit is then designed for a flux of B lines/in.², and the coil winding is made of length L inches so that the no load stroke produces a no load velocity $v$ inches/sec. such that the resulting back EMF given by Equation $a$ is equal to the input voltage to the coil. This effectively shuts off current flow through the coil, and stops further amplitude buildup.

Then when a load is applied, the absorption of energy by the load will cause the stroke to drop off a certain percentage. This in turn will cause the back EMF to fall a corresponding percentage below the fixed voltage supplied to the coil. A through net voltage will then act on the coil causing coil current I through coil impedance Z.

This current through winding 34 produces a force P (equations for which are derived subsequently) which adds energy to the vibrating system. A steady state operating amplitude under load will exist when the net voltage is sufficiently large that the resulting current and force on the moving masses supply energy at the same rate that energy is being absorbed by the work output.

Prudent design of the magnetic field system and winding 34 will allow a very small coil impedance Z to be obtained so that the net voltage with a 5 to 15 percent stroke drop-off will be sufficient to generate full load power. At all loading conditions, of course, a small windage and friction load exists and automatically causes the stroke to be slightly below its nominal value to allow sufficient net voltage and current to provide power to offset these losses.

The role of the transformer may now be clarified further. In small motor sizes, a small stroke will result in a small peak velocity $v$, and a small gap volume will limit winding length L which can be used without excessive coil impedance. Where these limitations prevent the above back EMF from being made equal to the peak supply voltage, a transformer or equivalent is used in the input circuit to winding 34 to match input voltage to back EMF available at no load operating amplitude.

The above represents in a very general and simplified way the operating characteristics of the rudimentary form of the invention illustrated by FIGS. 1–4. In order to design a motor with the most desirable operating characteristics, however, it is necessary to have available and understand further engineering relationships which define and establish these characteristics. A derivation of the governing equations has therefore been briefly covered in the following paragraphs utilizing the diagrammatic dynamic system shown in FIG. 5 to define elements in the basic equations. In FIG. 5, and in what follows, the mass 12 and appropriate portions of the springs 18 (one-third of the masses of springs 18) will be designated as mass system $m_2$; mass 14 plus appropriate portions of springs 22 (one-third of the masses of springs 22) and appropriate portions of springs 18 and 20 (one-third of the spring masses in each case) will be designated as mass system $m_1$; and mass 16 plus appropriate portions of springs 20 (one-third) will be designated as mass system $m_3$. Displacements of these mass systems will be designated as $x_1$, $x_2$ and $x_3$; velocities as $\dot{x}_1$, $\dot{x}_2$ and $\dot{x}_3$; and accelerations as $\ddot{x}_1$, $\ddot{x}_2$ and $\ddot{x}_3$, with the plus direction taken in FIG. 5 as downward.

The sinusoidally varying supply voltage will cause, through current flow in power winding 34, equal and opposite forces P to be imposed on the end masses 12 and 16, one direction only being shown in FIG. 5. The differential equations of motion may be written as follows, $k_1$, $k_2$ and $k_3$ being the spring constants of springs 22, 18 and 20 respectively.

$$m_1\ddot{x}_1 + (k_1+k_2+k_3)x_1 - k_2x_2 - k_3x_3 = 0 \quad (1)$$

$$m_2\ddot{x}_2 - k_2x_1 + k_2x_2 + C_2\dot{x}_2 = -P \quad (2)$$

where $C_2$ is the damping coefficient associated with the work output at mass system $m_2$; $C_2\dot{x}_2 = -F_2$.

$$m_3\ddot{x}_3 - k_3x_1 + k_3x_3 + C_3\dot{x}_3 = +P \quad (3)$$

where $C_3$ is the damping coefficient associated with the work output at mass system $m_3$; $C_3\dot{x}_3 = -F_3$.

Since we are dealing with sinusoidal forces, the following substitutions may be made in Equations 1, 2 and 3:

$$\ddot{x}_1 = -w^2 x_1$$
$$\dot{x}_1 = jwx_1$$
$$\ddot{x}_2 = w^2 x_2$$
$$\dot{x}_2 = jwx_2$$
$$\ddot{x}_3 = w^2 x_3$$
$$\dot{x}_3 = jwx_3$$

where $w$ in each of these six equations is the frequency in radian measure of the sinusoidal voltage supplied to the power coil (operating frequency).

Also we may express the spring rates $k_1$, $k_2$ and $k_3$ in terms of the respective uncoupled natural frequencies. Thus:

$$(w_1)^2 = \frac{k_1 + k_2 + k_3}{m_1} \qquad k_1 + k_2 + k_3 = m_1(w_1)^2$$

$$(w_2)^2 = \frac{k_2}{m_2} \quad \text{from which} \quad k_2 = m_2(w_2)^2$$

$$(w_3)^2 = \frac{k_3}{m_3} \qquad k_3 = m_3(w_3)^2$$

Making the above substitutions in Equations 1, 2 and 3 and solving for the displacements $x_1$, $x_2$ and $x_3$ yields the following solutions:

$$x_1 = \frac{P}{D}\left[\frac{k_3}{m_1 m_3}\left(\frac{jwC_2}{m_2} + (w_2)^2 - w^2\right)\right.$$
$$\left. - \frac{k_2}{m_1 m_2}\left(\frac{jwC_3}{m_3} + (w_3)^2 - w^2\right)\right] \quad (4)$$

$$x_2 = \frac{P}{D}\left[-\frac{((w_1)^2 - w^2)}{m_2}\left(\frac{jwC_3}{m_3} + (w_3)^2 - w^2\right) + \left(\frac{k_2 k_3 + (k_3)^2}{m_1 m_2 m_3}\right)\right] \quad (5)$$

$$x_3 = \frac{P}{D}\left[\left(\frac{(w_1)^2 - w^2}{m_3}\right)\left(\frac{jwC_2}{m_2} + (w_2)^2 - w^2\right) - \left(\frac{k_2 k_3 + (k_2)^2}{m_1 m_2 m_3}\right)\right] \quad (6)$$

where $w$ is the frequency of the alternating voltage source in radians per second and $$D = ((w_1)^2 - w^2)\left(\frac{jwC_2}{m_2} + (w_2)^2 - w^2\right)\left(\frac{jwC_3}{m_3} + (w_3)^2 - w^2\right)$$
$$-\left(\frac{(k_2)^2}{m_1 m_2}\right)\left(\frac{jwC_3}{m_3} + (w_3)^2 - w^2\right) - \left(\frac{(k_3)^2}{m_1 m_3}\right)\left(\frac{jwC_2}{m_2} + (w_2)^2 - w^2\right) \quad (7)$$

Important engineering relationships and operating characteristics of this invention may be brought out by applying Equations 4 through 7 to two particular cases of this basic configuration.

In Case 1, work is extracted from one end of the motor, say $m_3$, and the mass $m_2$ at the opposite end is tuned to the supply frequency so that $w_2 = w$, and $C_2 = 0$. Solving Equation 6 for P, then, gives $$P = \left[\frac{1}{1 + \frac{k_3}{k_2}}\right][\dot{x}_3 C_3 + x_3((w_3)^2 - w^2) m_3] \quad (8)$$

Equation 8 establishes from mechanical considerations the size of the force P which must be produced by the electromagnetic system for Case 1 when the force $F_3$ (FIG. 5) to be delivered to the work ($F_3 = -\dot{x}_3 C_3$) and the working stroke half amplitude $x_3$ are specified.

The force is expressed in Equation 8 as the sum of two components 90 degrees apart. The component in phase with velocity (first term) represents energy being delivered to the system for transfer into the work output. The component in phase with displacement (second term) involves energy oscillation between storage in the spring and the electrical supply system, and contributes nothing to the work output of the motor.

The total force required will be the vector sum of these components which can be obtained from Equation 8 by inspection as $$|P| = \left[\frac{1}{1 + \frac{k_3}{k_2}}\right] x_3 \sqrt{(C_3 w)^2 + [m_3((w_3)^2 - w^2)]^2} \quad (9)$$

This force must be developed by the electromagnetic system of the motor in accordance with the basic electromagnetic relationship $$P = \frac{BLI}{8.0 \times 10^6} = \text{peak force} - \text{lbs.} \quad (10)$$

where

B = magnet gap flux density—lines/in.$^2$
L = length of winding 34 exposed to flux density B—inches
I = RMS current—amperes. The method of developing and controlling this current has already been covered in the discussion of back EMF with Equation a.

The force P is always exactly in phase with the current I.

If a phase angle $\phi$ is defined as that angle by which the force P lags the velocity $\dot{x}_3$, then Equation 8 shows that $\phi$ will be given by $$\phi = \tan^{-1}\left[\frac{m_3((w_3)^2 - w^2)}{C_3 w}\right] \quad (11)$$

Since only that component of the force P which is in phase with the velocity $\dot{x}_3$ will contribute to the mechanical energy output, then $\cos \phi$ is a power factor expressing the fraction of the force P (and therefore current I) that is doing useful work.

If $w_3 = w$, the power factor is of course unity, and it can be shown easily that deviation of $w_3$ by 2 percent from the value $w_3 = w$ will require a 16 percent increase in P and therefore also in current I through the power coil 34 to produce the same work as when $w_3 = w$.

Thus, the natural frequencies of the two mass systems $m_2$ and $m_3$ should both preferably be made equal to the frequency $w$ of the alternating voltage source, or must deviate less than 2 percent if excess current (with an accompanying operating amplitude drop-off) is to be held under 16 percent.

Investigation of the displacement term $x_1$ in Equation 4 will yield information as to the vibration imparted to the casing 10. Thus, rewriting Equation 4 and substituting Equation 7 therein and making the previous assumption $C_2 = 0$ while imposing the condition $w_3 = w_2 = w$ yields:

$$x_1 = P/k_2 \quad (12)$$

where P is established from Equation 8 and $k_2$ is established from $k_2 = m_2(w_2)^2 \cong m_2 w^2$. $x_1$ will be found typically to be very small compared to $x_2$ and $x_3$ even when $m_2$ is designed as light as possible, and will be zero when P is zero.

If the motor casing is clamped rigid to a base, the force transmitted into the base will be $$F = x_1 k_1 = \frac{k_1}{k_2} P \quad (13)$$

where $k_1$ is the stiffness of spring 22 between mass $m_1$ and casing 10. $k_1$ will be typically about 10 to 20 percent of $k_2$ since its only function is to hold the spring mass system about central longitudinally within the case against the force from the work output.

If the motor casing is unrestrained, the casing will vibrate with a displacement half amplitude $x_c$ which will not exceed $$x_c = \frac{k_1 P}{k_2 m_c w^2} \quad (14)$$

where $m_c$ is the mass of the case.

The displacement $x_c$ will be found typically very small compared to $x_1$ and minute compared to $x_3$ and $x_2$ for all designs including minimum weight design.

The amplitude of oscillation of mass $m_2$ may be established from Equation 5 using the value of P obtained from Equation 8. It will be found that the value of $x_2$ thus obtained is well approximated by $$x_2 \cong -x_3 \frac{m_3}{m_2} \qquad (15)$$

where $x_3$ is the desired stroke half amplitude used in computing P in Equation 8 or 9. The end masses therefore oscillate out of phase with amplitudes inversely proportional to the size of the respective masses. This offers a convenient method of obtaining a large stroke $x_3$ with small internal motion of the magnet system by making $m_2$ larger than $m_3$ by the desired ratio.

When there is no transformer or ballast on $m_3$, then $m_2$ tends to be larger than $m_3$ by a factor between 2 and 4. Where a transformer is required, it may be attached to the casing to further minimize casing vibrations in accordance with Equation 14.

If the Case 1 motor is to be used for a short stroke, high force output application, then the following development is useful.

Equation 8 may be given alternatively as $$P = \frac{1}{1 + \frac{m_3(w_3)^2}{m_2(w_2)^2}} [\dot{x}_3 C_3 + x_3\{(w_3)^2 - w^2\} m_3] \qquad (8a)$$

since $k_3 = m_3(w_3)^2$ and $k_2 = m_2(w_2)^2$
so that $$\frac{k_3}{k_2} = \frac{m_3(w_3)^2}{m_2(w_2)^2}$$

Then when $w_3 = w_2 = w$, Equation 8a may be simplified to $$P = \frac{1}{\left(1 + \frac{m_3}{m_2}\right)} [F_3] \qquad (8b)$$

where $F_3$ (as indicated with Equation 3 and FIG. 5) is the force between output shaft and work. Solving Equation 8b for $F_3$ gives $$F_3 = P\left[1 + \frac{m_3}{m_2}\right] \qquad (8c)$$

Equation 8c shows that when mass $m_3$ (to which output shaft is attached) is small compared to $m_2$, then the force output $F_3$ which is delivered to the work is only slightly larger than the force P developed by current through the power coil. When the mass $m_3$ is from 2 to 4 times as large as $m_2$, then Equation 8c shows that the force $F_3$ will be three to five times as large as the force P, but will have a short stroke as compared to the mass $m_2$ as indicated by Equation 15. This concludes the examination of Case 1.

It is, of course, possible also to extract work from both end masses 12 and 16 as is diagrammatically shown in FIG. 5. These end masses are represented by $m_2$ and $m_3$ respectively in Equations 1 through 7 which are the equations of motion and their solution for this three-degree-of-freedom system. Important engineering relationships and characteristics for this type of operation may be brought out by considering these equations as applied to Case 2 which is characterized by the following: (a) the forces exerted at each end of the motor against the work are equal $(C_2 \dot{x}_2 = C_3 \dot{x}_3)$; and (b) the natural frequencies of the end masses on their respective springs are equal to each other, i.e., $w_2 = w_3 = w_n$ by definition.

Equations 4 through 7 may now be written for Case 2 as:

$$x_1 = \frac{P}{D}\left[\frac{(w_n)^2}{m_1}\left(\frac{jwC_2}{m_2} + (w_n)^2 - w^2\right) - \frac{(w_n)^2}{m_1}\left(\frac{jwC_3}{m_3} + (w_n)^2 - w^2\right)\right] \qquad (16)$$

$$x_2 = \frac{P}{m_2 D}(E) \qquad (17)$$

$$x_3 = \frac{P}{m_3 D}(E) \qquad (18)$$

where $$D = \left(\frac{jwC_3}{m_3} + (w_n)^2 - w^2\right)(E) \qquad (19)$$

and $$E = \left[((w_1)^2 - w^2)\left(\frac{jwC_3}{m_3} + (w_n)^2 - w^2\right) - \frac{(w_n)^4}{m_1}(m_2 + m_3)\right] \qquad (20)$$

Proceeding as in Case 1, the absolute value of the required electromagnetic force P may be shown from Equation 18 to be $$|P| = x_3 \sqrt{(wC_3)^2 + [m_3((w_n)^2 - w^2)]^2} \qquad (21)$$

with a phase angle between this force and the velocity $\dot{x}_3$ given by $$\phi = \tan^{-1}\left\{\frac{m_3((w_n)^2 - w^2)}{C_3 w}\right\} \qquad (22)$$

with cos $\phi$, as in Case 1, representing the electromechanical power factor showing the fraction of current I that is used effectively in generating mechanical power. Since Equation 22 corresponds exactly with phase angle Equation 11 of Case 1, it follows that deviation of the end mass natural frequency from the supply frequency $w$ will have the same effect on efficiency as was found for Case 1.

When the forces at each end of the motor against the work are equal, it will follow that $$\frac{jwC_2}{m_2} = \frac{jwC_3}{m_3}$$

Applying this equality to Equation 16 shows the two terms inside the bracket to be equal but of opposite sign so that $$x_1 = 0 \qquad (23)$$

Thus, for Case 2, the center mass will not move, and no disturbance will be transmitted to the motor case regardless of the work output and the relative sizes of the end masses and springs.

Finally, for Case 2, if Equation 17 is divided by Equation 18, it is found that $$\frac{x_2}{x_3} = \frac{m_3}{m_2} \qquad (24)$$

For this case then, the end masses will oscillate with exactly opposed displacements, with amplitudes inversely proportional to the relative sizes of the masses, thus creating the inertia balance which eliminates vibration transmission to the case. Where a transformer is required and it is desired that $x_2 = x_3$, then placement of the transformer on the end mass opposite the magnet system will be advantageous to help equalize the size of the end masses. Equation 24 will be found to apply, at least with good approximation for all configurations of this invention, where natural frequency and other specified conditions are met. This concludes the examination of Case 2.

The configurations of this invention may be divided into two basic types distinguished by the place of attachment of the magnetic and power coil components. If both of these elements are attached to end masses, we have one basic motor type characterized in FIG. 6 with the electromagnetic force P and its reaction —P acting between end masses 52 and 50. FIGS. 1 through 5, and all discussion of the invention to this point, have been for this basic type. If either magnet system or power coil is attached to the intermediate mass, we have the second basic type characterized in FIG. 9 by the electromagnetic force P and its reaction —P acting between end mass 72 and intermediate mass 74.

Considering the first motor type, FIG. 1 shows the situation wherein the power coil winding 34 is carried by the same mass from which work is extracted, FIG. 7a shows the same arrangement but with work extracted from both ends, and FIG. 8a shows the arrangement wherein the upper end mass 56 carries the power coil winding by means of the bus bars 58 and 60 which cooperate with the magnetic field carried by the lower end mass 62, and with the work being extracted from this lower end mass.

The FIG. 8 embodiment represents merely a kinematic inversion of the FIG. 1 case and the equations previously developed for FIG. 1 apply thereto.

The general equations for the types generally depicted in FIG. 6 were developed in Equations 1 through 7 and particular solutions for the type illustrated in FIGS. 1 and 8 were developed in connection with Equations 8 through 12 whereas Equations 16 through 24 relate to the FIG. 7 embodiment.

It will be noted that FIGS. 6, 7 and 8 and some subsequent figures, show the magnet system and power coil as a concentric cylindrical system rather than the flat system of FIG. 1. This equivalent cylindrical system is described subsequently in connection with FIGS. 13 through 19.

Figure 8B:
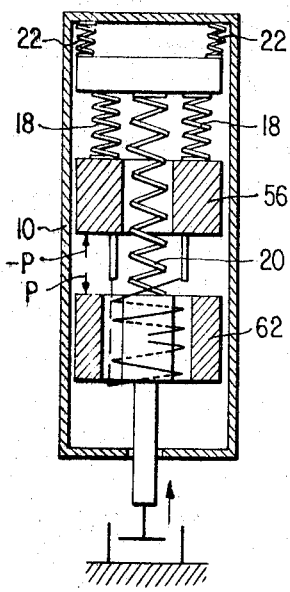

Note also that while the two end masses which are attached to the intermediate mass have been shown on opposite sides of the intermediate mass, dynamically identical systems (the same equations of motion apply exactly) may be obtained in all cases with both "end" masses on the same side of the "intermediate" mass. This is illustrated by FIG. 7b which is exactly equivalent to FIG. 7a, and by FIG. 8b which is exactly equivalent to FIG. 8a. Corresponding changes can be made in FIGS. 10, 11 and 12.

Attention is now turned to the second basic motor type where electromagnetic force P and reaction —P are developed between one end mass and the intermediate mass, as generally shown in FIG. 9, with particular configurations shown in FIGS. 10 through 12. These figures show upper and lower end masses 70 and 72 and a central mass 74 as before presented in each case. As will be seen from FIGS. 10–12, the power coil is carried by the center mass 74. In FIG. 10, work is extracted from the lower mass 72 which carries the magnetic field. In FIG. 11, work is extracted from both ends of the FIG. 10 embodiment and in FIG. 12, two power coil windings are utilized with the central mass 74 carrying both windings, and work is extracted from both end masses each of which contains a magnetic field.

If the differential equations of motion for the three-degree-of-freedom system of FIG. 9 are solved using the definitions of components and motions corresponding to those used in the development of Equations 1 through 7 for the FIG. 6 configuration, then the solution of these equations for the displacement half amplitudes of the three masses for the FIG. 9 configuration will be found to be $$x_1 = \frac{P}{m_1 D}\left[\frac{jwC_2}{m_2} + (w_2)^2 - w^2\right]\left[w^2 - \frac{jwC_3}{m_3}\right] \quad (25)$$

$$x_2 = \frac{P}{m_1 D}\left[w_1 - \frac{jwC_3}{m_3}\right]((w_2)^2) \quad (26)$$

$$x_3 = \frac{P}{m_1 D}\left\{\left[\frac{jwC_2}{m_2} + (w_2)^2 - w^2\right]\right.$$

$$\left.\left[((w_1)^2 - w^2)\left(\frac{m_1}{m_3}\right) - (w_3)^2\right] - (w_2)^4 \frac{m_2}{m_3}\right\}$$

$$(27)$$

where $$D = ((w_1)^2 - w^2)\left(\frac{jwC_2}{m_2} + (w_2)^2 - w^2\right)\left(\frac{jwC_3}{m_3} + (w_3)^2 - w^2\right)$$

$$- ((w_3)^2)\left(\frac{jwC_2}{m_2} + (w_2)^2 - w^2\right)\left(\frac{k_3}{m_1}\right)$$

$$- ((w_2)^2)\left(\frac{jwC_3}{m_2} + (w_3)^2 - w^2\right)\left(\frac{k_2}{m_1}\right) \quad (28)$$

Following the procedures used to develop Equations 8 through 11 and 16 through 24 from Equations 4 through 7, Equations 25 through 28 may be used on the configurations of FIGS. 10 and 11 to determine the electromagnetic force requirements, electromechanical power factor, and operating amplitudes. Such a study will reveal the following important characteristics.

The configuration of particular significance is that of FIG. 10 with work extracted from the lower mass $m_3$ end only, with the mass $m_2$ on its spring tuned to the supply current frequency (so that $w_2 = w$ and $C_2 = 0$). It is found here that:

(a) $x_1 = 0$, indicating that the intermediate mass $m_1$ is stationary for all values of work output regardless of the natural frequency $w_3$ of the mass $m_3$. Thus, the casing of this motor will have no vibration transmitted to it by the spring $k_1$ connecting the intermediate mass $m_1$ to the case.

(b) The electromagnetic force P required will be given by $$|P| = x_3\sqrt{[m_3((w_3)^2 - w^2)]^2 + [wC_3]^2} \quad (29)$$

Comparing Equation 29 with Equation 9 for the FIG. 8 type motor shows that the FIG. 10 type motor requires a force P larger than that of the FIG. 8 type motor by the factor $(1 + k_3/k_2)$, comparing two motors of the same stroke and power output. A correspondingly heavier magnet system for increased gap flux density in the FIG. 10 motor can be used to supply the necessary additional force and also provide increased back EMF in the power coil to make up for the negligible coil velocity due to its attachment to mass $m_1$.

(c) The phase angle between the force P and the velocity $\dot{x}_3$ of mass $m_3$ is the same as given by Equation 11 for the FIG. 8 type motor. The criteria on electromechanical power factor and deviation of the natural frequency $w_3$ from the operating frequency $w$, which were given for the FIG. 8 type, motor, therefore also apply to the FIG. 10 motor.

The configuration of FIG. 12 is considered next as having two power coils and two magnet systems of the FIG. 10 motor type. The power coils are mounted rigidly from the intermediate mass with their windings normally in series for maximum back EMF and corresponding applied voltage. If a transformer is necessary, it may be made part of the intermediate mass as indicated by item 74 of FIG. 12.

Current flowing through the power coils then give electromagnetic forces against the end masses, with reactions against the intermediate mass which cancel each other. This, in effect, then leaves equal and opposite forces against the end masses which thus gives a dynamic system corresponding to FIG. 7 so that Equations 16 through 24 and the associated discussions apply.

The FIG. 12 motor is therefore essentially equivalent to the FIG. 7 motor with the advantage that the power coils and transformer will have very slight motion.

FIGS. 1 through 12, which have been presented to this point, are diagrams of the rudiments of this invention. FIGS. 13 through 19 indicate supplemental engineering design arrangements to illustrate important practical aspects of the basic and complementing elements of this invention.

FIGS. 13 through 16 show the end masses in circular cylindrical form. With reference now more particularly to FIGS. 13 and 14, a modified form of one end mass is shown therein which carries a permanent magnet assembly for producing the flux field through which the power coil or winding moves. There is provided a base member indicated generally by the reference character 100 which, as may be seen in FIG. 14, has opposite flat sides 102 and 104 and a central recess 106 extending upwardly in its lower end face 108 for the reception of a spring 110 hereinafter more particularly described. The outer wall 112 of the base 100 is generally of cylindrical section except for the flat portions 102 and 104 previously described and there is provided a centrally located hub 114 within which the recess 106 is formed, the hub and outer wall forming an annular passageway 116 therebetween.

Additionally, the base member 100 is provided with a pair of diametrically opposed and vertically upstanding web portions 118 and 120 as can be seen more clearly in FIG. 14. Secured to this base are four permanent magnet guadrants 122, 124, 126 and 128 disposed as shown in FIG. 14 and presenting the gaps 130 and 132 at diametrically opposite sides of the assembly, the purpose of which will be apparent presently. Additionally, there is provided a centrally located permanent magnet 134 which is of cylindrical configuration and which is of a diameter generally the same as the diameter of the hub 114. The several permanent magnet quadrants and the central permanent magnet 134 are aligned to provide North and South poles as shown in FIG. 13 so that dense flux fields of generally radial character are provided within the annular air gap 140 within which the power coil or winding indicated diagrammatically by the reference character 142 in FIG. 13 is adapted to reciprocate.

FIG. 15, with its end view FIG. 16, shows the second end mass which includes the winding or power coil 142 in cylindrical coil form mounted from a base 144 by means of upright arms 146 and 148 on opposite sides. The top of the arm may be bridged with yoke 150. The arms 146 and 148 are received within the gaps 130 and 132 (FIG. 14) of the other end mass and straddle the flat portions 102 and 104, and the winding 142 is positioned by the yoke assembly for relative reciprocation with respect to the permanent magnet assembly.

Where a transformer is used for matching coil back EMF to supply voltage, it may be made part of the base as shown in FIG. 15. Here the cup-like base 144 carries the transformer primary winding 152, and wound about the force transmitting member 154 is the transformer secondary 156 which is electrically connected to the winding 142 as previously described. Transformer eddy current heating will, of course, be minimized by appropriate radial slotting and/or bonded laminations of transformer iron.

As may be seen clearly in FIGS. 13 and 15, a reversal in the direction of the power coil winding 142 is effected intermediate the ends thereof for the purpose of providing the maximum possible cancellation of flux generated by the current flowing in the winding. With each coil half centered in radial magnetic fields at opposite ends of the magnet system of FIG. 13, a single direction of thrust will be seen to come from the upper and lower portions of the winding with one direction of current flow.

Also, when the winding is centered in the magnetic field, the flux generated in the lower half of the magnet assembly due to current flowing in the lower winding portion will cancel the flux generated in the upper half of the magnet assembly due to the same current flowing through the upper half of the winding. This is important for three reasons: (1) It allows a much larger number of total ampere turns to be used (for large force P) with relatively small danger of demagnetizing the magnets from alternating flux from the coil; (2) it reduces the inductive reactance of the winding nad therefore reduces this restriction on total current flow and the resultant force output; and (3) it reduces magnet heating from eddy currents generated by variations in flux magnitude.

Soft iron pole pieces for magnet flux control have not been shown, but could, of course, be used where their contribution to magnet mass and coil inductive reactance is not seriously detrimental.

The magnet mass system of FIG. 13 and the power coil mass system of FIG. 15 are shown mounted in a motor casing 162 in FIG. 17 where the magnet mass system is generally indicated by the reference character 210, and the power coil mass system 174 is represented by the base 144 and output force transmitting member 154 with power coil omitted for clarity of other parts. Although the upper end of the motor is not shown in FIG. 17, it will be appreciated that a force transmitting member corresponding to 154 may be attached to the top end of the magnet mass and extended out through that end of the case, where extraction of energy from both ends of the motor is desired.

Upper spring 110 and lower spring 214 connect these end masses to the intermediate mass 204 with a nesting arrangement for minimum overall length. Spring 110 seats at its lower end within a cup-like extension 212 forming parts of the center mass 204. The cup 212 centers the spring 214 which serves to mount the lower end mass assembly 174 to the central mass 204, it being noted that the central mass 204 is provided with a bellows-like spring device 216 having a flange 218 resiliently mounting the center mass 204 on the casing 162.

FIG. 17 shows one method of cooling and venting the motor. During that half of the stroke when the end masses move toward each other, the air between these end masses in central region 184 tends to be compressed, and the air pressure in the chambers between the end masses and the ends of the motor case tends to drop. An open valve 167 in the top of the transformer then allows air to pass through passages 169 and 171, then through passages 168 and 170 along the transformer coils, and through passages 164 and 166 to the lower compartment 172. During the outward stroke of the end masses, the sliding washer valve moves to the upper end of the valve chamber 167 due to its own inertia, and closes the valve.

Downward motion of the end mass then tends to compress the air in lower compartment 172 forcing it out through casing orifices 178 and 180 toward the work. A reed valve 182 or equivalent as indicated at orifice 178, may be used to eliminate all return flow and form a dust seal. This action thus exhausts the case.

Filtered air intakes at the opposite end of the casing then allow cool air to be drawn downward through the power winding gap 140 for coil cooling, and through vent holes 209 and 213 to the lower mass compartment 184.

It will be readily recognized that the opposed piston motion of the end masses of all configuration makes this motor type, with suitable valve systems, readily utilized as a gas compressor or pump with negligible case vibration.

FIG. 17 also shows the manner in which connection can be made to the transformer primary winding 152. A pair of blades, one of which is indicated by the reference character 190 is in rubbing contact with a bus bar 192 fixed to the inner side of the casing 162 and electrically connected as diagrammatically illustrated by the conductor 194 through the overload switch 196 to the lead 198 extending to the power source. A similar arrangement is provided for the opposite end of the primary winding, the blade 190 being connected by a conductor as diagrammatically indicated by the conductor 200 to one end of the primary 152. The overload switch 196, with reset button 202, will normally be of the type tripped by high amperage. In the case of the FIG. 8 type motor, however, where the amplitude of the intermediate mass 204 increases with increasing work output (see Equation 12) a mechanically tripped switch may be placed next to intermediate mass 204 so that trip button 203 is actuated by large amplitude of mass 204.

FIG. 18 shows a modified form of spring arrangement with two upper springs 226 and 228 acting in parallel between upper mass 230 and intermediate mass 220, and two lower springs 234 and 236 acting in parallel between intermediate mass 220 and lower mass 260. The use of springs in parallel, of course, increases the amplitude of oscillation of end masses that can be obtained without exceeding allowable spring stresses. The nesting arrangement of FIG. 17 has been used in the FIG. 18 configuration, with cups 222 and 224 attaching the upper springs to the intermediate mass.

This particular spring arrangement allows a modified form of electrical connection for the transformer primary 242. As shown, the opposite ends of the primary winding are connected by means of conductors 246 and 248 which electrically connect with the springs 234 and 236 and further conductors at the center mass as indicated by the reference characters 250 and 252 connect these springs to resilient blades 254 and 256 which extend externally to the power source and may also be part of the spring mount of the intermediate mass 220 to the motor casing. It will be appreciated, of course, that for this lead arrangement, the center mass portion 258 and the lower end mass portion 260 will be formed of non-conducting material, or conducting parts will be suitably isolated.

Figure 19:
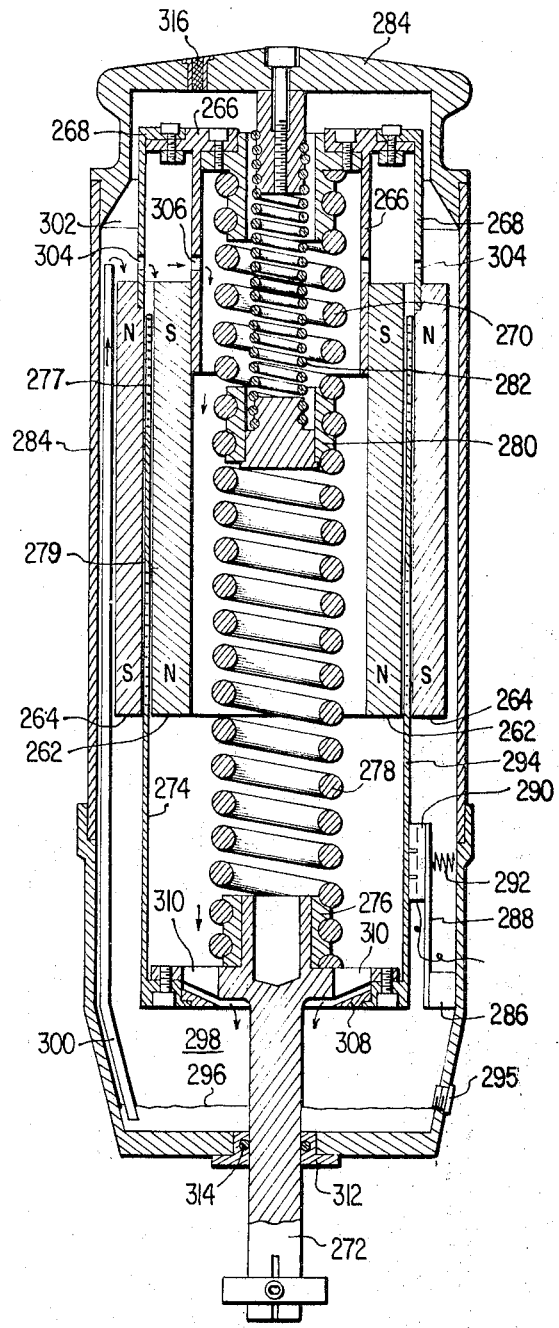
FIG. 19 is a longitudinal section through a further modified form of the motor.

FIG. 19 illustrates an alternate circular cylindrical form of the basic motor type having the electromagnetic force and reaction developed between end masses with work extracted at one end only. The upper mass includes inner and outer circular cylindrical ring magnets 262 and 264 held in position by non-magnetic inner and outer assembly rings 266 and 268 which in turn are secured to the upper end of upper spring 270.

The lower mass includes work output shaft 272 with means at its upper end for fastening it to the lower end of the cylindrical sleeve 274 of the power winding assembly, and means 276 for attaching these elements to the lower end of spring 278.

Intermediate mass 280 includes means for its attachment between upper spring 270 and lower spring 278, and for attachment to lower end of spring 282 which extends from the intermediate mass to the upper end of motor casing 284, thus elastically positioning the upper, lower, and intermediate masses within the casing.

A transformer has not been included as an internal mass on the motor of FIG. 19. Thus, where power coil and magnet system are not designed for line voltage operation, an externally mounted transformer or equivalent means would be used to alter line voltage to motor operating voltage. With no internal transformer, the magnet end mass tends to be approximately four times as large as the power output end mass. Consequently, the case clearance allowed for motion of the power output end mass, is approximately four times that allowed for magnet end mass motion in accordance with Equation 15, and a large work output stroke is obtained while exposing the magnets to a relatively small vibratory acceleration level.

It will be appreciated that the motor of FIG. 19 can be converted into a short stroke high output force motor by attaching the power output shaft to the magnet mass (heavy mass) rather than to the power coil mass (light mass) resulting in a large value of $m_3/m_2$, and giving a large output force $F_3$ in accordance with Equation 8c, and a small stroke $x_3$ in accordance with Equation 15.

The power coil winding incorporated into the upper portion of cylindrical ring 274 has an upper section 277 and a lower section 279 wound to give a single direction of thrust when operating in the upper and lower magnet gap fluxes respectively, as previously discussed in connection with FIGS. 13, 14, and 15. Coil length will be determined by the consideration presented in connection with Equation a. The power coil winding should have minimum impedance to give minimum no load to full load operation amplitude drop-off. While magnets have been shown with straight cylindrical surfaces, it will be appreciated that gap width may be varied to control flux density distribution across the gaps.

Electrical power input to the coil is through sliding contacts. Brush assemblies of which one is shown in FIG. 19, are placed around the inside circumference of the casing with base block 286, brush holder 288, brush 290, and contact pressure spring 292. Brush surface has been shown as slotted in two perpendicular directions to provide good scrubbing action and oil pressure relief to keep contacting surface 294 scrubbed free of oil film for good electrical sliding contact.

Contacting surface 294 is a conducting strip bonded into cylinder 294 but insulated from it, and with a lead to power coil. At least one such brush assembly shall be used for each end of the coil and for each intermediate tap-off. Tap-offs on the power coil winding provide an effective shortening of the coil and will result in larger operating amplitudes as explained in the discussion with Equation a.

This motor illustrates a closed case with an oil bath lubrication and cooling system. The bottom of the motor casing is used as an oil sump with fill plug 295 and oil level indicated by 296. When the motor is used in the upright position shown in FIG. 19, air pressure differential is developed in lower chamber 298, by means described later, forcing oil up through tubes attached to the wall at a suitable number of points around the circumference of the casing. Oil flow is indicated in FIG. 19 by arrows through tube 300 exiting from the top of the tube into upper chamber 302 just above the magnets for lubrication between casing and outer ring magnet 264.

Oil will also discharge through vent holes 304 to lubricate power coil winding 276 in magnet gap. Surplus oil will pass through vents 304 for drainage back through inner chamber 306 to lower casing chamber 298.

Air pressure differential between chambers 306 and 298 is developed by valve action in the top of power output shaft 272 accompanying reciprocatory motion of the lower mass assembly. The valve consists of a ring 308 with an essentially triangular cross section shown in solid black in FIG. 19. This ring moves axially a short distance in its compartment, due to its own inertia, with reciprocatory motion of the lower mass with shaft 272.

This motion opens passages 310 between chambers 306 and 298 when the shaft moves up, and closes this passage when the shaft moves down. Downward motion of the lower mass assembly will be seen to tend to reduce the volume of chamber 298 thereby increasing chamber pressure and forcing oil and air up through passage tubes 300. The open passages on the upstroke allow return oil and air to pass down through the passages 310 to the lower chamber 298. This forced circulation of air and oil carries heat away from the winding and magnet area, and causes heat to be dissipated over most of the casing. Attitude of the motor casing relative to gravity, of course, will not affect the above forced air circulation.

The power output shaft exit through the casing is provided with wear resistant bushing 312, with O ring 314 or equivalent packing to retain oil and seal out dirt.

A tightly filtered breathing vent 316 is shown at the top of the case for pressure equalization, as the inside air heats and cools with operation of the motor. This effective sealing of the case makes this motor suited for operation in dusty environments.

It will be appreciated that the motor of FIG. 19 can be converted into a short stroke high output force motor by attaching the power output shaft to the magnet mass (heavy mass) rather than to the power coil mass (light mass), resulting in a large value of $m_3/m_2$, and giving a large output force $F_3$ in accordance with Equation 8c, and a small stroke $x_3$ in accordance with Equation 15.

What is claimed is:

1. A motor for producing reciprocating work output along an axis, comprising in combination,
a casing,
a mass system housed within said casing and including first and second end masses and an intermediate mass having their centers of gravity lying substantially along said axis,
a resilient suspension connecting said intermediate mass to said casing to allow movement of said intermediate mass along said axis, and resilient means connecting each end mass to said intermediate mass to allow individual movement of said end masses along said axis whereby the intermediate mass locates said mass system within said casing along said axis, said resilient connection being of a stiffness very much less than that of said resilient means,
a work output member connected to at least one of said end masses, and
power means for reciprocating said end masses substantially at their natural frequencies in relatively opposite directions along said axis, said power means comprising a member for producing a magnetic flux field directed essentially transversely of said axis, a winding member disposed in said flux field, alternating current source means connected to said winding member, the alternatiing current being of predetermined frequency, said end masses with their resilient means having natural frequencies which are substantially the same as said predetermined frequency of the alternating current, one of said members being carried by said one end mass and the other member being carried by another of said masses, and said winding member having its turns disposed to be cut by said flux field essentially at right angles in response to reciprocation of said mass system, whereby reduction in back EMF caused by reduction in relative amplitude between said one end mass and said another mass causes an increase in current flowing through said winding member.

2. The device as defined in claim 1 wherein the EMF produced in said winding member is equal to the voltage of said current source at a predetermined no load amplitude of reciprocation of the mass system.

3. The device as defined in claim 1 wherein said current source means includes an electrical transformer having a primary and a secondary connected to said winding member, the EMF produced in said winding member being equal to the voltage of said transformer secondary at a predetermined no load amplitude of reciprocation of said mass system.

4. The device as defined in claim 3 wherein said transformer is carried by the other end mass.

5. The device as defined in claim 3 wherein said transformer is carried by said intermediate mass.

6. The motor as defined in claim 1 wherein said member for producing a magnetic flux field comprises a pair of permanent magnets disposed in closely spaced relation, said winding member being of flat form and being movable between said magnets.

References Cited

UNITED STATES PATENTS

| 3,201,932 | 8/1965 | Spaning et al. | 310—25 XR |
| 2,617,050 | 11/1952 | Weinfurt | 318—119 XR |
| 3,394,275 | 7/1968 | Lippmann | 310—15 XR |
| 3,123,755 | 3/1964 | Braithwaite et al. | |
| 3,172,121 | 3/1965 | Doyle et al. | 310—16 |
| 2,776,560 | 1/1957 | Erath et al. | 310—27 XR |
| 2,591,795 | 4/1952 | Eisler | 310—15 XR |
| 2,959,747 | 11/1960 | Challacombe et al. | 310—15 XR |
| 3,366,809 | 1/1968 | Scott | 310—15 |
| 2,926,313 | 2/1966 | Wiegand | 310—15 XR |
| 3,219,854 | 11/1965 | McLaughlin | 335—259 XR |

MILTON O. HIRSHFIELD, Primary Examiner

B. A. REYNOLDS, Assistant Examiner

U.S. Cl. X.R.

310—17, 28; 318—126